United States Patent [19]

Ozaki

[11] Patent Number: 4,789,206
[45] Date of Patent: Dec. 6, 1988

[54] QUICK-RELEASE TYPE CLAMPING ASSEMBLY FOR BICYCLE HUB

[75] Inventor: Nobuo Ozaki, Osaka, Japan

[73] Assignee: Maeda Industries, Ltd., Osaka, Japan

[21] Appl. No.: 34,929

[22] Filed: Apr. 6, 1987

[30] Foreign Application Priority Data

Apr. 11, 1986 [JP] Japan .................................. 61-84626

[51] Int. Cl.$^4$ ............................................ B62K 25/02
[52] U.S. Cl. .................... 301/111; 301/105 B
[58] Field of Search .............. 301/105 R, 105 B, 111, 301/115, 124 R, 128; 280/279; 403/55, 261, 260, 409.1; 269/236; 70/233

[56] References Cited

FOREIGN PATENT DOCUMENTS 460495 11/1950 Italy ..................................... 301/111
57-171902 10/1982 Japan .

Primary Examiner—Robert B. Reeves
Assistant Examiner—Joseph D. Pape
Attorney, Agent, or Firm—Birch, Stewart, Kolasch & Birch

[57] ABSTRACT

A quick-release type clamping assembly for a bicycle hub comprising a tie rod having one end screwed to a nut and the other end provided with an enlarged head, the enlarged head being formed with a cam hole extending therethrough transversely of the rod as well as with a first threaded portion extending axially of the rod, a hollow presser member fitted around the enlarged head and movable relative thereto axially of the rod toward and away from the nut, a lever mounted to the presser member and pivotable about a pivotal axis between a clamping position and a releasing position, the lever having a cam portion received within the cam hole and eccentric relative to the pivotal axis so that the cam portion moves the presser member relative to the enlarged head axially of the rod in response to pivotal movement of the lever, a lock member having a second threaded portion adjustably screwed to the first threaded portion, and the lock member further having a stopper portion for abutment with the presser member to limit axial movement thereof away from the nut.

4 Claims, 3 Drawing Sheets

QUICK-RELEASE TYPE CLAMPING ASSEMBLY FOR BICYCLE HUB

BACKGROUND OF THE INVENTION

1. Field of the Invention

This invention relates to a quick-release type clamping assembly for releasably or removably mounting a wheel hub to a pair of fork ends of a bicycle frame, and more particularly to such clamping assembly which is improved to prevent unexpected removal or detachment, from the fork ends, of the hub in its mounted condition.

2. Description of the Prior Art

In bicycles, generally, it is often required to remove a wheel hub from a pair of fork ends of a bicycle frame for replacement or repair, for example. For this purpose, Japanese Utility Model Application Laid-open No. 57-171902 discloses a quick-release type clamping assembly for a bicycle hub which enables quick removal of the hub when required.

More particularly, the clamping assembly of the above laid-open utility model application comprises a tie rod extending through a tubular hub shaft on which a hub shell is rotatably supported between a pair of fork ends. The tie rod has one end screwed to a nut positioned axially outwardly of one fork end. The other end of the rod is provided with an enlarged head positioned axially outwardly of the other fork end and having a cam hole extending transversely of the rod. A hollow presser member is fitted around the enlarged head and axially movable relative thereto toward and away from the nut. A lever, which is pivotable about a pivotal axis between a clamping position and a releasing position, is mounted to the presser member and has a cam portion received within the cam hole and eccentric relative to the pivotal axis.

When the lever is pivoted to the clamping position, the presser member is moved axially inwardly toward the nut due to the eccentricity of the cam portion. As a result, the distance between the nut and the presser member is reduced to clamp the hub (hub shaft and hub shell) to the fork ends.

Conversely, when the lever is pivoted to the releasing position, the presser member is moved axially outwardly away from the nut, so that the hub and the fork ends are relieved from the previous clamping force to enable ready removal of the hub (wheel).

As described above, the quick-release type clamping assembly has an advantage of enabling quick mounting and removing of the hub. However, such a clamping assembly has a disadvantage that the hub (wheel) can be unexpectedly removed during cycling when, for example, the lever accidentally comes into contact with a foreign object and is thereby pivoted in the releasing direction. In other words, the advantage of the quick-release type clamping assembly also leads to a serious disadvantage.

In order to overcome such a disadvantage, the quick-release type clamping assembly of the above described Japanese laid-open utility model application further comprises a lock member having a threaded shank for adjustable screw engagement with an axial threaded hole formed in an axially outer end wall of the presser member. The threaded shank of the lock member has a front end which, when screwably advanced, comes into abutment with the cam portion of the lever to frictionally prevent unintended pivotal movement of the lever from its clamping position.

The lock member of the prior art, however, is still insufficient in completely preventing unexpected pivotal movement of the lever and resultant removal of the hub. This is because the threaded shank of the lock member comes into contact with the cam portion of the lever at a relatively small distance from the pivotal axis of the lever, whereas the lever has an arm portion extending a substantial length from the pivotal axis. Thus, even a relatively small force on the arm portion of the lever can overcome the friction between the cam portion and the lock member shank portion to cause unexpected pivoting of the lever from the clamping position.

SUMMARY OF THE INVENTION

It is, therefore, an object of the present invention to provide a quick-release type clamping assembly which can almost completely prevent unexpected or accidental removal of a wheel hub from a pair of fork ends of a bicycle frame.

Another object of the invention is to provide a quick-release type clamping assembly which can fixedly set the distance between a nut and a presser member even when a lever is unexpectedly pivoted in a releasing direction.

A further object of the invention is to provide a quick-release type clamping assembly which still enables ready removal of the hub when required for repair or replacement, for example.

According to the invention, there is provided a quick-release type clamping assembly for a bicycle hub comprising a tie rod having one end screwed to a nut and the other end provided with an enlarged head, the enlarged head being formed with a cam hole extending therethrough transversely of the rod as well as with a first threaded portion extending axially of the rod, a hollow presser member fitted around the enlarged head and movable relative thereto axially of the rod toward and away from the nut, a lever mounted to the presser member and pivotable about a pivotal axis between a clamping position and a releasing position, the lever having a cam portion received within the cam hole and eccentric relative to the pivotal axis so that the cam portion moves the presser member relative to the enlarged head axially of the rod in response to pivotal movement of the lever, a lock member having a second threaded portion adjustably screwed to the first threaded portion, and the lock member further having a stopper portion for abutment with the presser member to limit axial movement thereof away from the nut.

Other objects, features and advantages of the present invention will become apparent from the following description of the preferred embodiments given with reference to the accompanying drawings.

However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
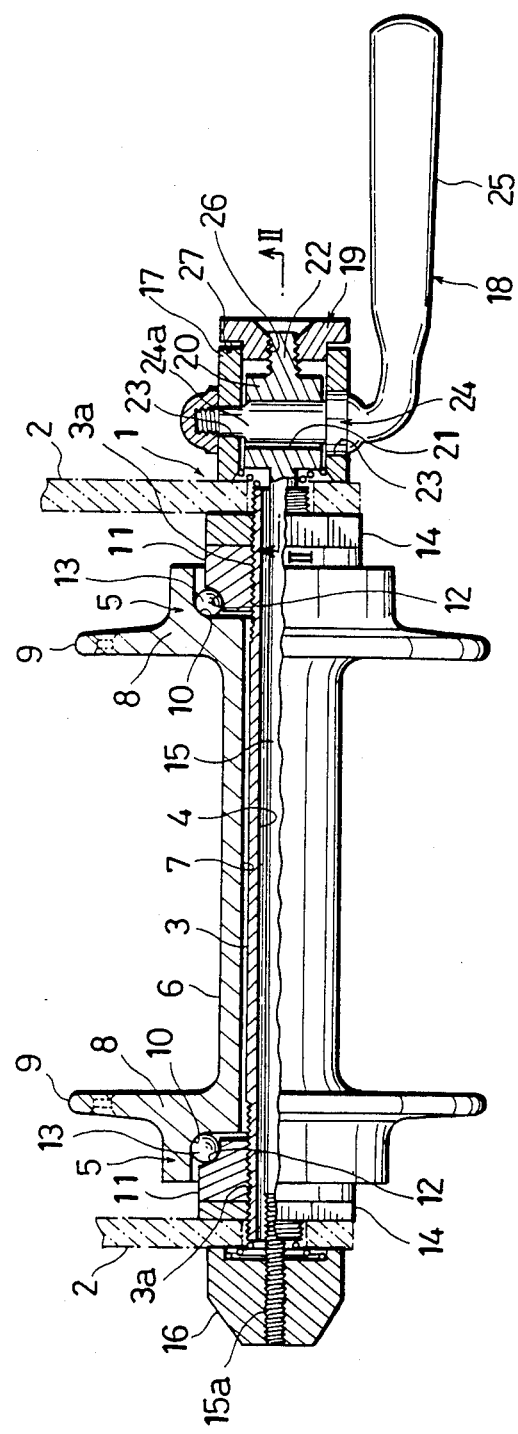
FIG. 1 is a front view, partly in section, of a quick-release type clamping assembly according to the invention as used to mount a wheel hub.

Throughout the accompanying drawings, like parts are referred to by the same reference numerals.

Referring now to FIG. 1, a quick-release type clamping assembly, generally represented by reference numeral 1, is used to releasably or removably mount a bicycle hub to a pair of front or rear fork ends 2.

The hub comprises a tubular hub shaft 3 having an axial through-bore 4. Rotatably supported on the hub shaft 3 by means of a pair of bearings 5 is a hollow hub shell 6 which has an axial through-bore 7 and a pair of enlarged end portions 8. Each enlarged end portion 8 is integrally formed with a mounting flange 9 to which is connected one end (radially inner end) of each spoke having the other end (radially outer end) connected to a wheel rim (not shown). The enlarged end portion is further provided with a cup-shaped inner surface 10 which communicates with the axial through-bore 7 and serves as an outer race of a corresponding bearing 5, as described below.

Each bearing 5 includes a ball retainer 11 adjustably screwed onto a corresponding threaded end portion 3a of the hub shaft 3 and formed with a generally conical outer surface 2 which constitutes an inner race. A series of steel balls 13 are interposed between the inner race 12 and its opposed outer race 10, so that the hub shell 6 is free to rotate on the hub shaft 3. A known double lock nut 14 is screwed onto the threaded end portion of the hub shaft 3 axially outwardly of the retainer 11 to prevent unexpected loosening of the latter.

The quick-release type clamping assembly 1 basically comprises a tie rod 15, a nut 16, a hollow presser member 17, a lever 18, and a lock member 19. The details of these parts are described below.

The tie rod 15 extends through the axial through-bore 4 of the hub shaft 3 and has a length which is greater than that of the shaft 3, so that both ends of the rod 15 project out of the shaft 3. One projecting end 15a of the rod 15 is threaded for adjustable screw engagement with the nut 16 which is positioned axially outwardly of one fork end 2.

The other projecting end of the rod 15 is integrally formed with an enlarged head 20 having a cam hole 21 which is elongated in cross section (see FIG. 2) and extends through the head 20 perpendicularly to the rod 15. The head 20 further has an integral projection 22 which is threaded and extends axially outwardly from one side of the head 20 opposite the rod 15. According to the illustrated example, the head 20 has a cylindrical outer surface.

The presser member 17, which is cylindrical according to the illustrated example, is fitted around the enlarged head 20 of the tie rod 15 at a position axially outwardly of the other fork end 2. The presser member is provided in its wall thickness with a diametrically opposite pair of lever receiving holes 23 substantially in corresponding relation to the cam hole 21. The two lever receiving holes 23, though differing in diameter according to the illustrated example, provides a common pivotal axis O (see FIG. 2) for the lever 18.

The lever 18 has a shaft portion 24 rotatably received in the lever receiving holes 23 of the presser member and extending through the cam hole 21 of the enlarged head 20. The lever 18 further has an arm portion 25 extending perpendicularly from the shaft portion 24. That part of the shaft portion 24 positioned within the cam hole 21 constitutes a cam portion 24a which is eccentric relative to the pivotal axis O of the lever 18 provided by the lever receiving holes 23, as better illustrated in FIG. 2. Thus, when the lever 18 is pivoted back and forth, the eccentric cam portion 24a of the lever 18 displaces axially of the rod 15, causing the presser member 17 to move axially relative to the enlarged head 20 toward and away from the nut 16 to vary the distance between the enlarged head 20 and the nut 16. Though the eccentric cam portion 24a also moves transversely of the rod 15 upon pivotal movement of the lever 18, such transverse movement of the cam portion 24a is allowed without causing traverse oscillation of the rod 15 because the cam hole 21 is elongated in cross section transversely of the rod 15 (see FIG. 2).

The lock member 19 illustrated in FIG. 1 centrally has a threaded axial bore 26 for adjustable screw engagement with the threaded projection 22 of the enlarged head 20. The lock member further has an annular outer stopper portion 27 for abutment with the axially outer end of the presser member 17. Thus, when the lock member 19 is screwably moved on the threaded projection 22 into abutment, at the stopper portion 27, with the presser member 17, the presser member 17 is no longer movable axially away from the nut 16.

Figure 2:
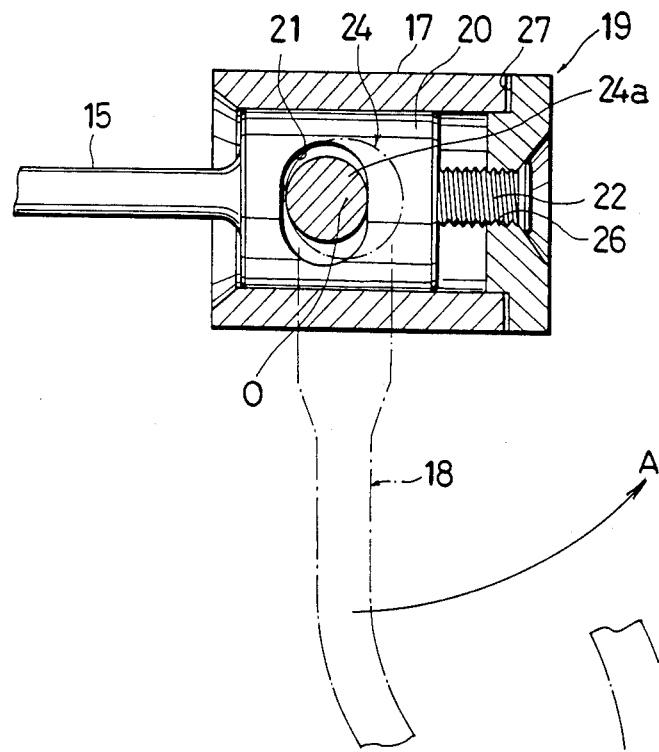
FIG. 2 is an enlarged section taken on lines II—II in FIG. 1 showing the clamping assembly in a releasing state.

In operation, when the lever 18 is in a release position shown in FIG. 2, the cam portion 24a of the lever 18 is located on an axially inner side, and the lock member 19 is located on the threaded projection 22 sufficiently away from the enlarged head 20. For fixedly mounting the hub (hub shaft 3, hub shell 6, etc.) to the pair of fork ends 2, the lever 18 is pivoted in the direction of arrow A (FIG. 2) to a clamping position shown in FIG. 3. As a result, the cam portion 24a displaces axially outwardly to move the enlarged head 20 axially outwardly relative to the presser member 17 (in other words, axially inward movement of the presser member 17 relative to the enlarged head 20), causing the distance between the nut 16 (FIG. 1) and the presser member 17 to reduce and thereby clamping the fork ends 2.

Figure 3:
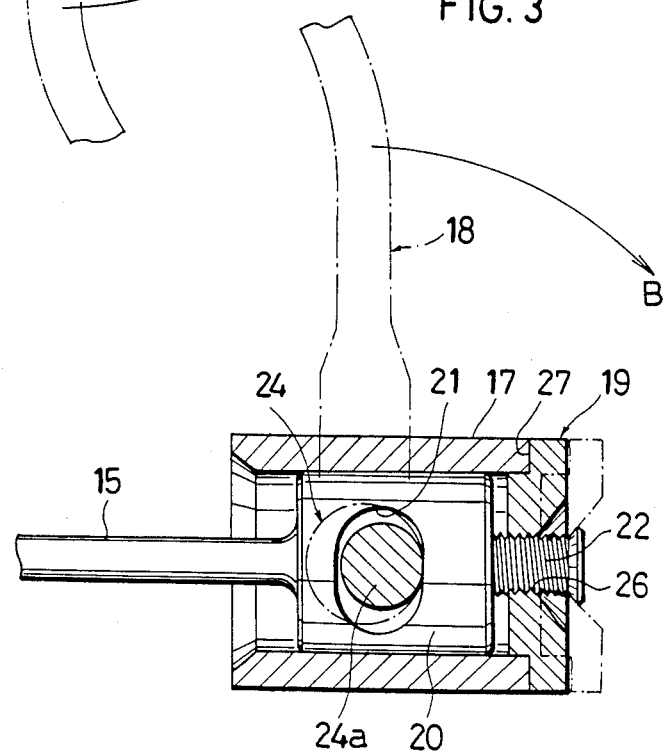
FIG. 3 is a sectional view similar to FIG. 2 but showing the clamping assembly in a clamping state.

After the above described clamping operation, the lock member 19 is spaced from the presser member 17 which has displaced axially inwardly, as indicated in phantom lines in FIG. 3. Subsequently, the lock member 19 is axially advanced into abutment, at the stopper portion 27, with the presser member 17.

Under the condition illustrated in FIG. 3, since the position of the lock member 19 relative to the enlarged head 20 is fixed (though variable only by turning) due to screw engagement, axially outward displacement of the presser member 17 relative to the enlarged head 20 is completely inhibited by the lock member 19. This means that the hub (wheel) which has been once thus clamped will not be unexpectedly removed from the fork ends 2.

If the lever 18 is subjected to some force tending to pivot it to the release position (FIG. 2), such pivoting of the lever 18 is reliably prevented because the presser member 17 is prohibited from moving axially outwardly. Further, even in case an extremely large force is applied which is enough to pivot the lever 18 toward the release position with resultant deformation of the cam portion 24a and/or the cam hole 21, the presser member 17 still remains prevented from moving axially outwardly by direct movement prohibition of the lock member 9.

Preferably, the lever 18 may be pivoted slightly toward the release position immediately after the lock member 19 comes into abutment with the presser member. In this way, the lock member 19 comes into highly frictional contact with the presser member 17 and is thus effectively prevented from unexpected loosening.

Alternatively, a spring washer (not shown) may be interposed between the stopper portion 27 of the lock member 9 and the axially outer end of the presser member 17. Such a spring washer also serves to prevent unexpected loosening of the lock member 19.

For removing the hub (wheel) from the fork ends 2, the lock member 19 is loosened and axially outwardly moved to the phantom line position shown in FIG. 3. Then, the lever 18 is pivoted in the direction of arrow B to the release position shown in FIG. 2, which results in the distance between the presser member 17 and the nut 16 increasing to relieve the hub from the clamping force.

Figure 4:
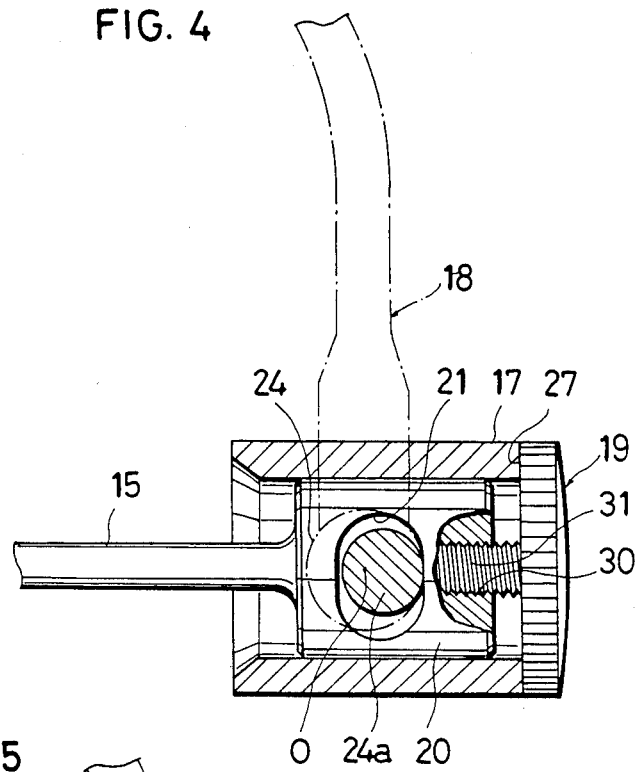
FIG. 4 is a sectional view also similar to FIG. 2 but showing a principal portion of a modified quick-release type clamping assembly according to the invention.

FIG. 4 illustrates a modification in which the enlarged head 20 of the tie rod 15 is formed with a threaded axial bore 30, whereas the lock member 19 is in the form of a headed bolt having a threaded shank for screw engagement with the axial bore 30. The enlarged head 27 of the bolt or lock member 19 acts as a stopper portion which comes into abutment with the axially outer end of the presser member 17 to inhibit axially outward movement of the latter.

Figure 5:
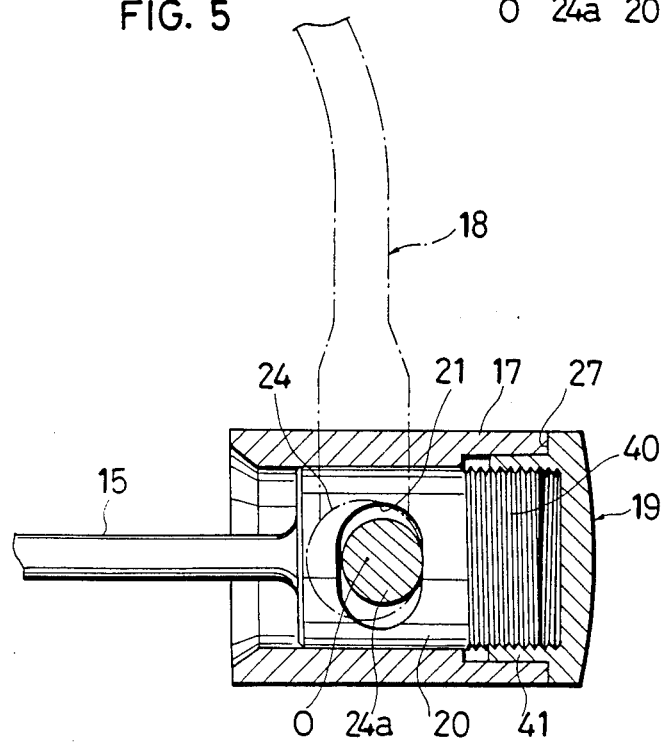
FIG. 5 is a sectional view similar to FIG. 2 but showing a principal portion of another modified quick-release type clamping assembly according to the invention.

In a further modification illustrated in FIG. 5, the cylindrical outer surface of the enlarged head 20 has an axially outer end portion 40 which is threaded, while the lock member 19 is in the form of a cap nut having a cylindrical projection 41 which is internally threaded for screw engagement with the outer end portion 40 of the enlarged head 20. The cap nut or lock member 19 further has an annular stopper portion 27 for abutment with the axially outer end of the presser member 17.

Obviously, the operation of the two modifications discussed above is substantially the same as that of the embodiment illustrated in FIGS. 1 to 3 and thus will not described again in order to avoid duplicated explanation.

The invention thus being described, it will be obvious that the same may be varied in many ways. For instance, it is possible to replace the cylindrical presser member 17 by a hollow presser member which is rectangular in cross section. Such variations are not to be regarded as a departure from the spirit and scope of the invention, and all such modifications as would be obvious to those skilled in the art are intended to be included within the scope of the following claims.

I claim:

1. A quick-release type clamping assembly for a bicycle hub comprising:
    a tie rod having one end screwed to a nut for engagement with a bicycle fork end;
    an enlarged head being provided at the other end of said tie rod, said enlarged head being formed with a cam hole extending therethrough transversely of said rod as well as with a first threaded portion extending axially of said rod;
    a hollow presser member fitted around said enlarged head for engagement with another bicycle fork end and being movable relative thereto axially of said rod toward and away from said nut for clamping and releasing said fork ends;
    a lever mounted to said presser member and being pivotable about a pivotal axis between a clamping position and a releasing position;
    said lever having a cam portion received within said cam hole and being eccentric relative to said pivotal axis for moving said presser member by said cam portion relative to said enlarged head axially of said rod in response to pivotal movement of said lever;
    a lock member having a second threaded portion adjustably screwed to said first threaded portion; and
    said lock member further having a stopper portion for direct abutment with said presser member to directly limit axial movement thereof away from said nut.

2. The assembly as defined in claim 1, wherein
    said first threaded portion is in the form of a threaded projection extending axially outward from said enlarged head, and
    said second threaded portion is in the form of a threaded axial bore formed in said lock member.

3. The assembly as defined in claim 1, wherein
    said first threaded portion is in the form of a threaded axial bore formed in said enlarged head, and
    said lock member is in the form of a bolt having a threaded shank serving as said second threaded portion.

4. The assembly as defined in claim 1, wherein
    said enlarged head has a cylindrical outer surface which is threaded at an axially outer end thereof to provide said first threaded portion,
    said lock member is in the form of a cap nut having a cylindrical projection which is internally threaded to provide said second threaded portion.

* * * * *